United States Patent [19]

Park

[11] Patent Number: 5,025,589
[45] Date of Patent: Jun. 25, 1991

[54] METHODS AND APPARATUS FOR GROWING THE BEAN SPROUTS

[76] Inventor: Young-keun Park, Soungsan Siyoung Apt., 17-1305, 450, Soungsan 2-dong, Mapo-ku, Seoul, Rep. of Korea

[21] Appl. No.: 367,044

[22] Filed: Jun. 16, 1989

[30] Foreign Application Priority Data

Jun. 16, 1988 [KR] Rep. of Korea ............... 88-7199

[51] Int. Cl.⁵ ............................................. A01G 31/00
[52] U.S. Cl. ............................................. 47/61; 47/62
[58] Field of Search ............................. 47/61, 60, 62

[56] References Cited

U.S. PATENT DOCUMENTS

| | | | |
|---|---|---|---|
| 679,124 | 7/1901 | Von Der Kammer | 47/61 |
| 3,965,614 | 6/1976 | Kienholz | 47/61 |
| 4,006,557 | 2/1977 | Sawyer | 47/61 |
| 4,086,725 | 5/1978 | Kwang | 47/61 |

FOREIGN PATENT DOCUMENTS

| | | | |
|---|---|---|---|
| 1222628 | 6/1987 | Canada | 47/61 |
| 1141377 | 9/1957 | France | 47/61 |
| 2508763 | 1/1983 | France | 47/61 |
| 8500269 | 1/1985 | World Int. Prop. O. | 47/61 |

Primary Examiner—Henry E. Raduazo
Attorney, Agent, or Firm—Leydig, Voit & Mayer

[57] ABSTRACT

In a method of growing bean sprouts, a plurality of bean sprouts beds are placed in layers upward and downward and the bean sprouts are arranged in the said bean sprouts beds in the order of their sizes of growth so that bean sprouts more largely grown are arranged in upper bed whereby growing and picking the bean sprouts in succession are possible in the limited area. An apparatus for growing bean sprouts comprises a top water reservoir, a measuring container, a water spray container, a planting container and a bottom water reservoir, all of the elements being arranged in layers from top to bottom, wherein the top water reservoir has a timer hole for controlling the flow rate of water flowing therethrough and the measuring containers supplies water to the water spray container at a certain time interval, and the planting container forms a plurality of bean sprouts beds in layers upward and downward.

18 Claims, 14 Drawing Sheets

METHODS AND APPARATUS FOR GROWING THE BEAN SPROUTS

BACKGROUND OF THE INVENTION

1. Field of the Invention

This invention relates to the methods and apparatus for growing the bean sprouts which can grow and pick the bean sprouts in succession and particularly it relates to the methods and apparatus for growing the bean sprouts which can automatically supply and spray a constant or predetermined amount of water at a certain time intervals and also are suitable for growing the bean sprouts in succession in the small area.

2. Prior Art

Heretofore, in order to grow the bean sprouts in the planting factory, a large planting bed for the bean sprouts has been formed by arranging a large number of the large planting containers side by side and independently in the same plane and then the grower has sprayed each container with water.

In such a conventional method there are many problems as followings;

(1) Since a lot of planting containers are arranged in the same plane in order to grow the bean sprouts in succession, considerably large area for planting the bean sprouts is required.

(2) Because water spray is carried out on each container arranged with a large area, much time and effort are required and extreme waste of water is caused.

(3) The grower can not leave the planting factory for a long time because water supply should be carried out periodically every a few hours.

(4) Extreme waste of water is caused by supplying always fresh water to each container and also much loss of nutrient kept in bean sprouts itself is caused by washing down the body thereof with fresh water every time of water supply.

(5) Especially in case of domestic plantation, it is almost impossible to grow the bean sprouts in succession because space for plantation is limited. Also, the house can not be left vacant during the plantation of the bean sprouts and then the considerable inconveniences for house-keeper cannot be avoid.

OBJECTS OF THE INVENTION

Accordingly, it is an object of the invention to provide improved method and apparatus for growing bean sprouts which are capable of growing in succession the bean sprouts in limited area without spraying water on each planting container.

Another object of the present invention is to provide method and apparatus for growing the bean sprouts which can prevent waste of water and much loss of inherent nutrient in the bean sprouts.

A further object of the present invention is to provide method and apparatus for growing the bean sprouts which is capable of automatically supplying predetermined amount of water at a certain time intervals without aid of a motorpump so that the efforts of the grower can be enormously saved.

Still a further object of the present invention is to provide method and apparatus for growing the bean sprouts which make it possible to grow in succession and to hygienically self-supply small amount of bean sprouts for oneself even in a private house having a small living spaces.

BRIEF SUMMARY OF THE INVENTION

These objects of the present invention can be achieved by providing a method for growing bean sprouts wherein a plurality of bean sprouts beds are placed in layers upward and downward and the bean sprouts are arranged in the said bean sprouts beds in the order of their sizes of growth so that bean sprouts more largely gown are arranged in upper bed.

To achieve above objects, the apparatus for growing bean sprouts of the present invention comprises a planting container means forming a plurality of bean sprouts beds in layers upward and downward and a bottom water reservoir positioned under the planting container means.

According to another aspect, the present invention provides an apparatus for growing the bean sprouts further comprising a top water reservoir having a timer hole for controlling the flow rate of the water flowing therethrough, a water spray container, and a measuring container for supplying water into the water spray container at a certain time intervals.

BRIEF DESCRIPTION OF DRAWINGS

Above mentioned and other objects as well as advantages of the present invention will be apparent from the following descriptions of the preferred embodiments of the present invention taken in connection with the accompanying drawings wherein:

FIG. 2 is a partially cutaway perspective view of a top water reservoir of the apparatus shown in FIG. 1, FIG. 3A to FIG. 3D show an embodiment of a timer hole formed in the bottom of the upper water reservoir wherein

FIG. 3E and FIG. 3F show another embodiment of the timer hole wherein FIG. 3E shows a sectional view thereof, and FIG. 3F shows a schematic top view thereof.

DETAILED DESCRIPTION OF THE INVENTION

Figure 1:
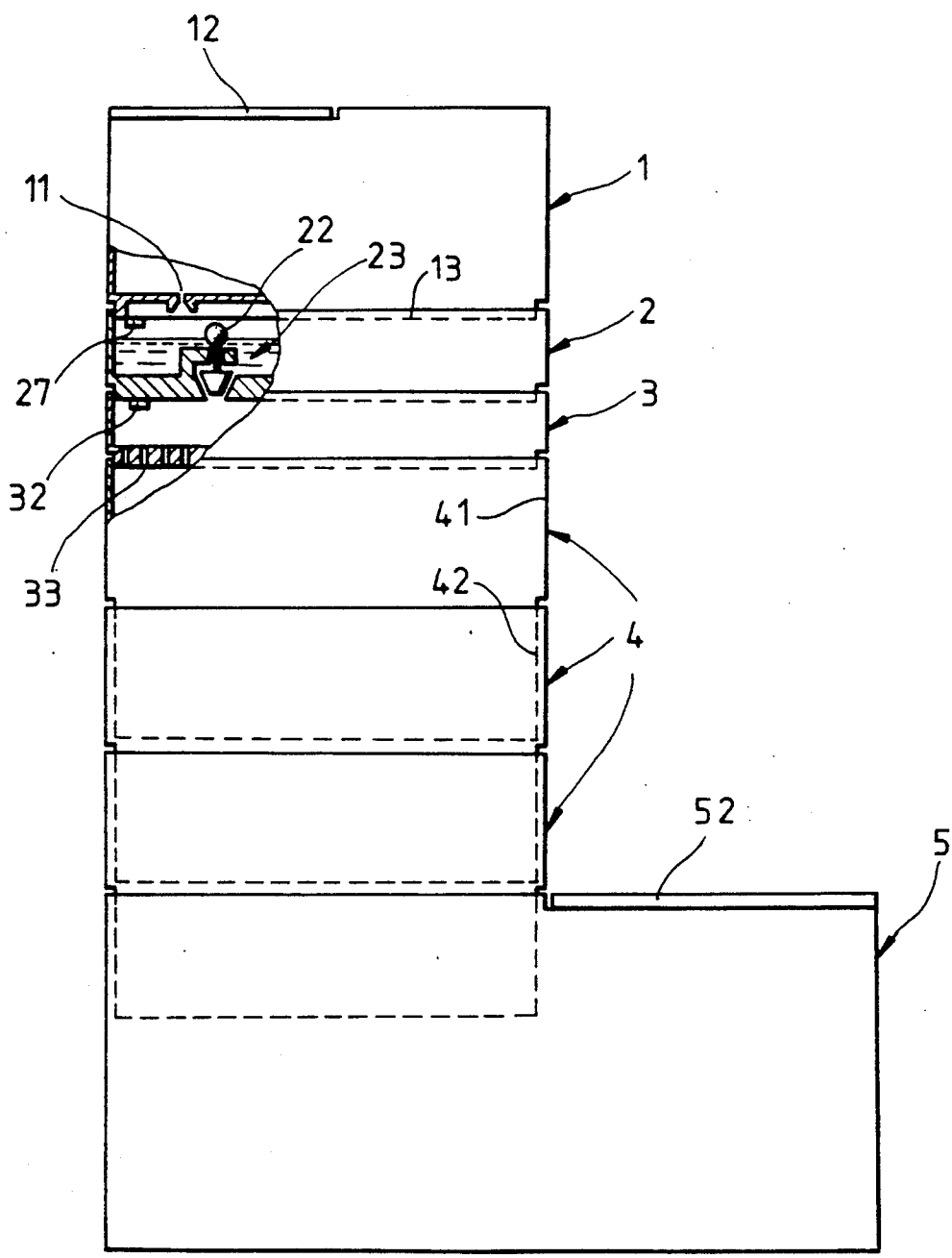
FIG. 1 is a partially cutaway front view of an embodiment of the apparatus for growing the bean sprouts according to the present invention.

As shown in FIG. 1, an embodiment of the apparatus for growing the bean sprouts according to the present invention comprises a top water reservoir 1, a measuring container 2, a water spray container 3, three planting containers 4 and a bottom water reservoir 5, which are shown in more detail in FIGS. 2 to 8, respectively.

Figure 2:
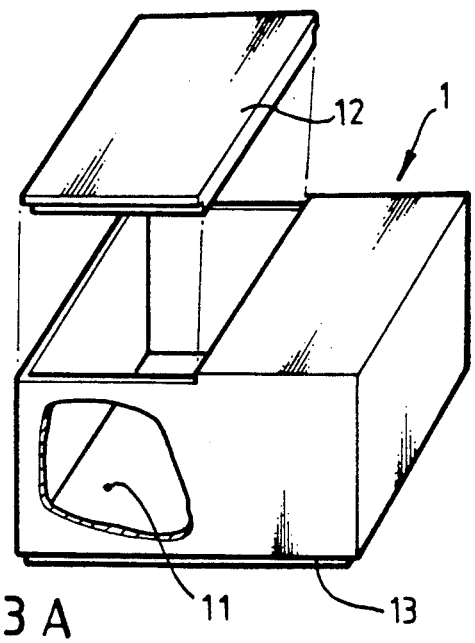

Referring now to FIG. 2, the top water reservoir 1 has a protrusion 13 and a timer hole 11 in its bottom. This protrusion 13 is inserted into the opening of the measuring container 2 so that the top water reservoir 1 can be mounted stably on the measuring container 2. The upper water reservoir is provided with a cover 12 on its top.

Referring to FIG. 3A to FIG. 3D, the constitutions and functions of an embodiment of the timer hole 11 will be described in detail, and then referring to FIG. 3E and FIG. 3F, the constitutions and functions of another embodiment of the timer hole 11 will be described in detail. The timer hole 11 of an embodiment shown in FIG. 3A to FIG. 3D comprises a fixed hole 11a having a downwardly flared extension 11b the radius of which gradually increases downwardly, and a control hole 11c formed in a control valve 15 in a form of a plannar plate. A control valve seat 18 is provided around the said fixed hole 11a so that the control valve 15 in a form of the rectangle can be coaxially mounted on the control valve seat 18. The shapes of the control valve and control valve seat are not limited to the above. The shapes thereof may be a circular or an ellipsoidal etc. The fixed hole 11a and the control hole 11c are properly eccentrically formed from the common center 14 of the control valve 15 and the control valve seat 18, respectively.

Therefore, the size of the common hole 17 formed by the superposition of the fixed hole 11a and the control hole 11c can be varied according to the relative angular positions between the control valve 15 and the control valve seat 18.

Figure 3A:
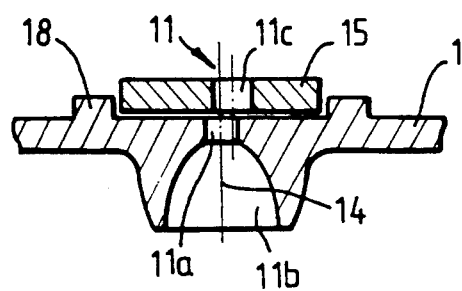
FIG. 3A shows a sectional view thereof.
Figure 3B:
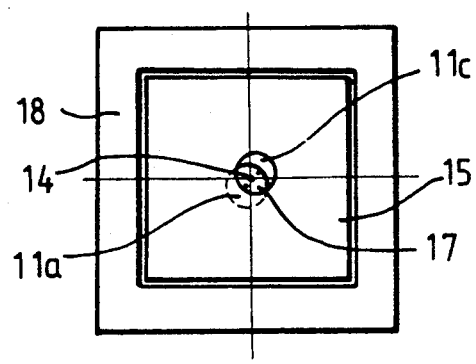
FIG. 3B shows a schematic top view thereof.
Figure 3C:
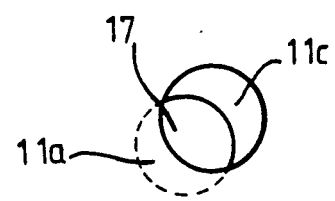
FIG. 3C and FIG. 3D are a schematic views thereof showing two states of the overlapping of a fixed hole and a control hole.
Figure 3D:
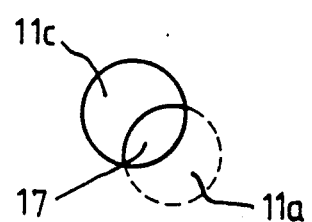
Figure 3:
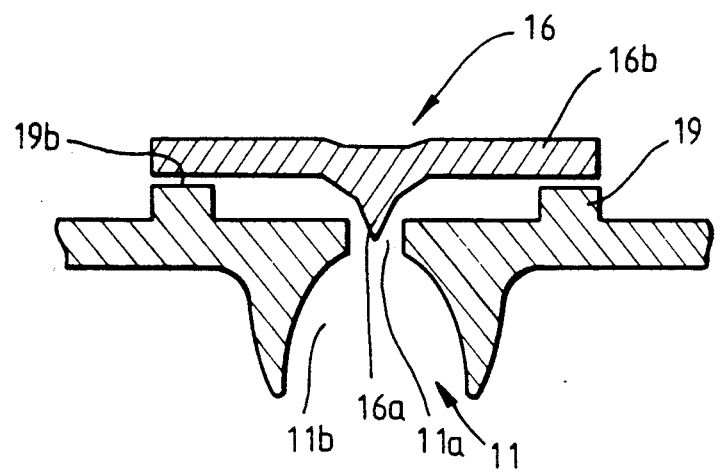
Figure 3:
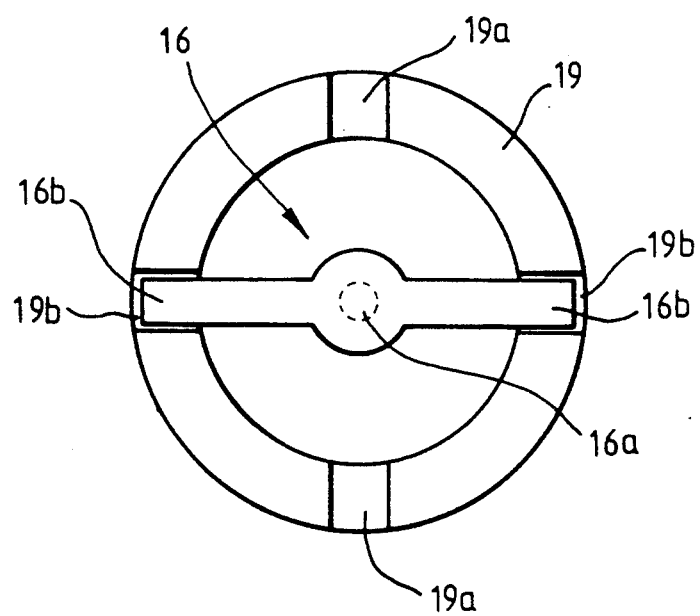

FIGS. 3C and 3D show schematically two states of the superposition therebetween. According to these drawings, the size of the common hole 17 at the position shown in FIG. 3C is larger than that at the position shown in FIG. 3D.

As described in the above, the flow rate of the water passing through the timer hole 11 can be controlled by changing the relative angular positions between the control valve and the control valve seat and then adjusting the size of the common hole 17.

Therefore, the time required for filling the measuring container 2 with a certain volume can be controlled properly.

The timer hole of another embodiment shown in FIG. 3E and FIG. 3F comprises the said fixed hole 11a having the downwardly flared extension 11b, and a needle valve 16 having a needle 16a and a hanger rods 16b. A hanger rod seat 19 is provided around the said fixed hole 11a having a hanger rod grooves 19a, 19b so that the hanger rods 16b can be mounted stably on the hanger rod grooves.

The level of location of a first hanger rod grooves 19a is, for example, higher than that of a second hanger rod grooves 19b.

When the hanger rods 16b of the needle vale 16 are located on the first hanger rod grooves 19a, the water flow rate passing through the timer hole 11 is greater than that of when the hanger rods 16b are located on the second hanger rod grooves 19b. Consequently, in case the hanger rod grooves are increased in their number the water flow rate passing through the timer hole 11 can be controlled.

A further embodiment of the timer hole 11 comprises only the fixed hole 11a having the downwardly flared extension 11b. In this case, the size of the fixed hole 11a is decided to fit well with a predetermined flow rate of the water passing through the timer hole 11.

The functions of the downwardly flared extension 11b will be described.

When the head of the water in the top water reservoir 1 is high, the velocity of the water passing through the fixed hole 11a will be faster than that of when the head of the water in the top water reservoir 1 is low in case the fixed hole 11a is not provided with the downwardly flared extension 11b. But, when the fixed hole 11a is provided with the downwardly flared extension 11b and is a very small size, the water filled in the downwardly flared extension 11b hinders the water in the top water reservoir 1 from passing through the fixed hole 11a in a fast velocity in case the head of the water in the top water reservoir 1 is high, and the water filled in the downwardly flared extension 11b pulls the water in the top water reservoir 1 downward and promotes the action that the water passes through the fixed hole 11a in case the head of the water in the top water reservoir 1 is low.

Therefore, by preparing the downwardly flared extension 11b the flow rate of the water passing through the timer hole 11 can be maintained somewhat constant regardless of the change of the water head in the top water reservoir 1.

Consequently, the time required for filling the measuring container 2 with a certain volume can be kept somewhat in a constant regardless of the change of the water head in the top water reservoir 1.

Figure 4:
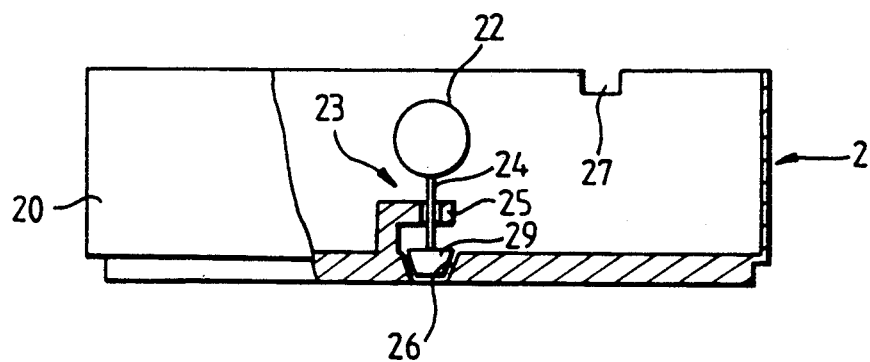
FIG. 4 is a partially cutaway front view of an embodiment of a measuring container for the apparatus shown in FIG. 1.

FIG. 4 shows an embodiment of a measuring container 2 according to the present invention. The measuring container 2 comprises a water container 20 formed with air vents 27 in the side thereof and a float valve 23 provided at the bottom of the water container.

The float valve 23 comprises a valve seat 26, valve 29, a valve stem 24, a valve stem guide 25 and a float 22. When the measuring container 2 is filled with a certain or predetermined amount of the water passing through the timer hole 11, the float valve 23 is opened by upwardly rising the float 22 and then the water is flushed from the measuring container 2 into the water spray container 3.

Figure 5:
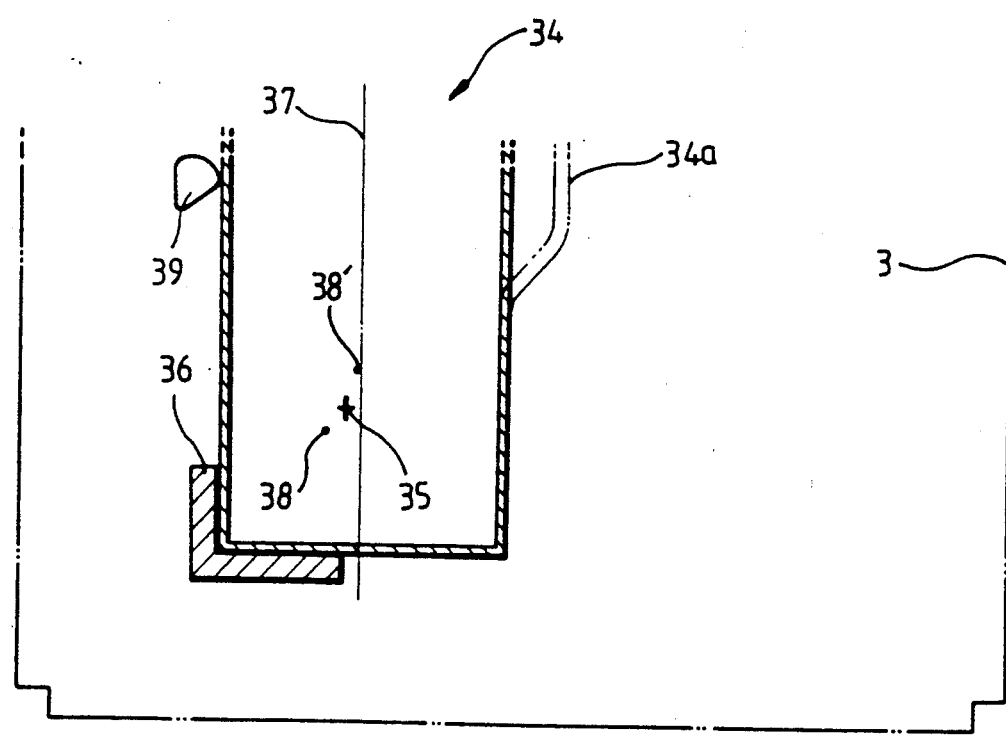
FIG. 5 is a schematic view of another embodiment of the measuring container.

FIG. 5 shows a tumbler type measuring container 34 according to another embodiment of the present invention.

The tumbler type measuring container 34 is pivotally supported in the water spray container 3 by a rotation shaft 35 which is properly eccentric to the bottom of the measuring container 34 as well as to the left from the vertical line 37 which divides the volume of the measuring container equally. Under the measuring container 34 toward the left thereof a proper mass of a weight 36 is attached. A stopper 39 mounted on the water spray container 3 is provided on the left inside of the measuring container so that the empty measuring container 34 can stay in an upright state and then can not be rotated further counterclockwise. According to the above constitution of the measuring container, when the measuring container is empty, its gravity center will be positioned in a point 38 left and under the rotation shaft 35 and then the measuring container will be maintained in a upright state by the stopper 39. When the measuring container is filling with water gradually, the gravity center will be moving upwardly and toward right, for example until reach a point 38' and then the measuring container 34 will be suddenly rotated about the rotation shaft clockwise as indicated by an arrow A, and then the water in the measuring container will be poured over into the water spray container 3. Thereafter, the measuring container 34 will be returned to the upright position by the weight 38. By repeating the above operation, the supply of water from the measuring container into the water spray container can be carried out at a certain time intervals. In order to ensure the rotation of the measuring container a projecting side 34a may be provided in a upper portion of the measuring container in the opposite side to the stopper 39 as shown by a dotted line in the drawing.

Figure 6:
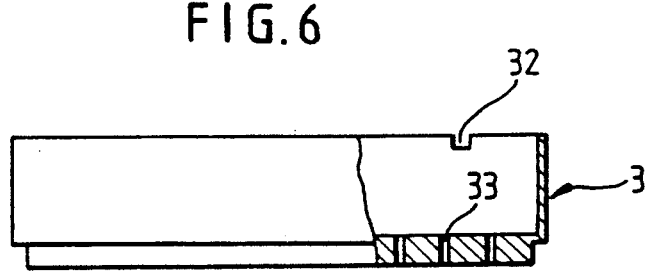
FIG. 6 is a partially cutaway front view of a water spray container of the apparatus shown in FIG. 1.

FIG. 6 shows a water spray container 3. The water spray container 3 is provided with a large number of a spray holes 33 in the bottom and an air vents 32 in the side.

Figure 7:
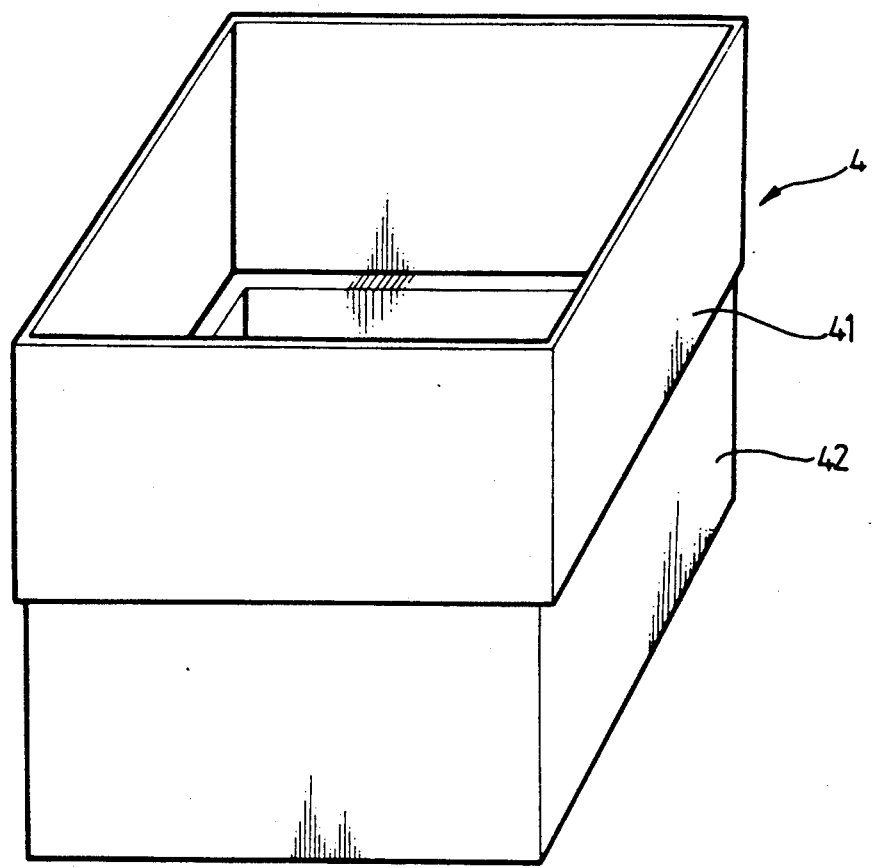
FIG. 7 is a perspective view of an embodiment of a planting container for the apparatus shown in FIG. 1.

FIG. 7 shows a planting container 4 which comprises an upper portion 41 and a lower portion 42. The lower portion 42 is formed so that it can be inserted into the upper portion of another planting container.

The bottom of the planting container is provided with a large number of a drain holes which is not shown in the drawing.

Figure 8:
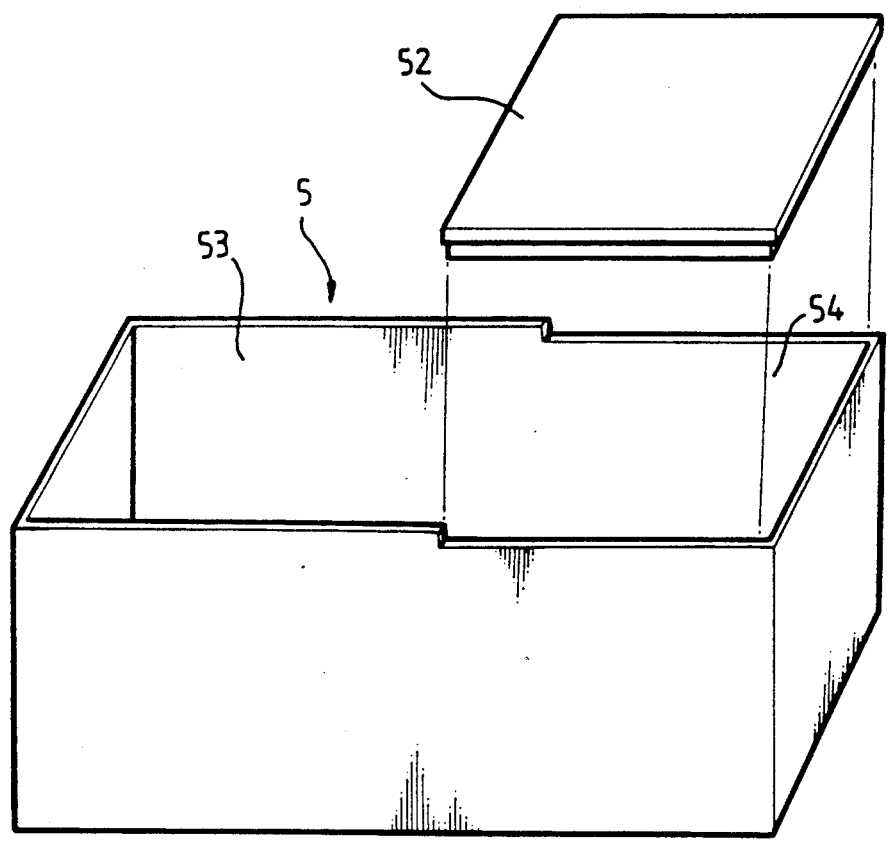
FIG. 8 is a perspective view of a lower water reservoir for the apparatus shown in FIG. 1.

FIG. 8 shows a bottom water reservoir 5. The lower portion 42 of a planting container 4 is inserted into an opening 53 of the lower water reservoir and the upper portion 41 of a planting container is mounted on the said opening 53 of the bottom water reservoir 5. On the other opening 54 of the bottom water reservoir 5 a cover 52 is mounted.

Now, the operation of the said embodiment of an apparatus for growing the bean sprouts will be described:

Firstly, when the top water reservoir 1 is filled with the water, the filled water drips down into the measuring container 2 through the timer hole 11.

When a certain time is passed and then the measuring container is filled with the water to a predetermined volume the float valve 23 will be opened by upwardly rising the float 22 and then the water will be flushed from the measuring container 2 into the water spray container 3. The water supplied to the water spray container is sprayed to the planting bed of the bean sprouts in the upper most planting container 4 through the spray holes 33 and then to the next planting bed in the next planting container through the drain holes in the bottom of the planting container which is not shown in drawings.

The water passing through the drain holes of the lowermost planting container is collected into the bottom water reservoir 5 in the purpose of reuse.

As described in the above, the apparatus for growing the bean sprouts of the present invention can automatically suprly a predetermined amount of the water at a certain time intervals by the timer hole 11 and can grow the bean sprouts in a small area by piling up the all elements of the said apparatus in layers.

Now, a representative method of growing the bean sprouts in succession will be described referring to FIG. 9.

Figure 9:
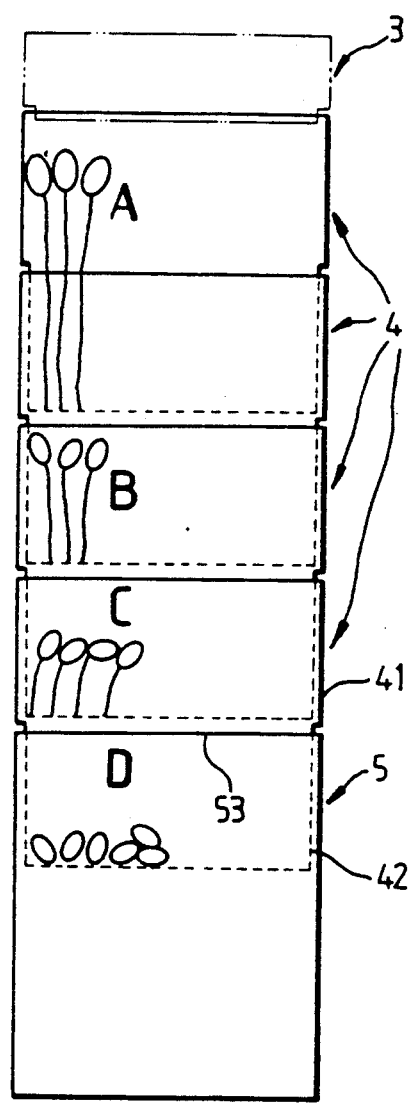
FIG. 9 is a side view of four planting containers being piled up which shows the method for growing the bean sprouts according to the present invention.

In FIG. 9, there are four planting container which are piled up. Bean sprouts A.B.C. in the planting containers are arranged in the order of their sizes of growth so that the size of the bean sprouts in an upper planting container is larger than that in a lower planting container. In the lowermost planting container, beans D are arranged. When the bean sprouts A in the uppermost planting container are grown properly enough to eat them, they are picked from the planting container. Thereafter, the empty planting container are filled again with another beans and are located under the said lowermost planting container. Therefore, by repeating this process, it is possible to grow the bean sprouts in succession and then to pick the bean sprouts properly grown in succession.

Figure 10:
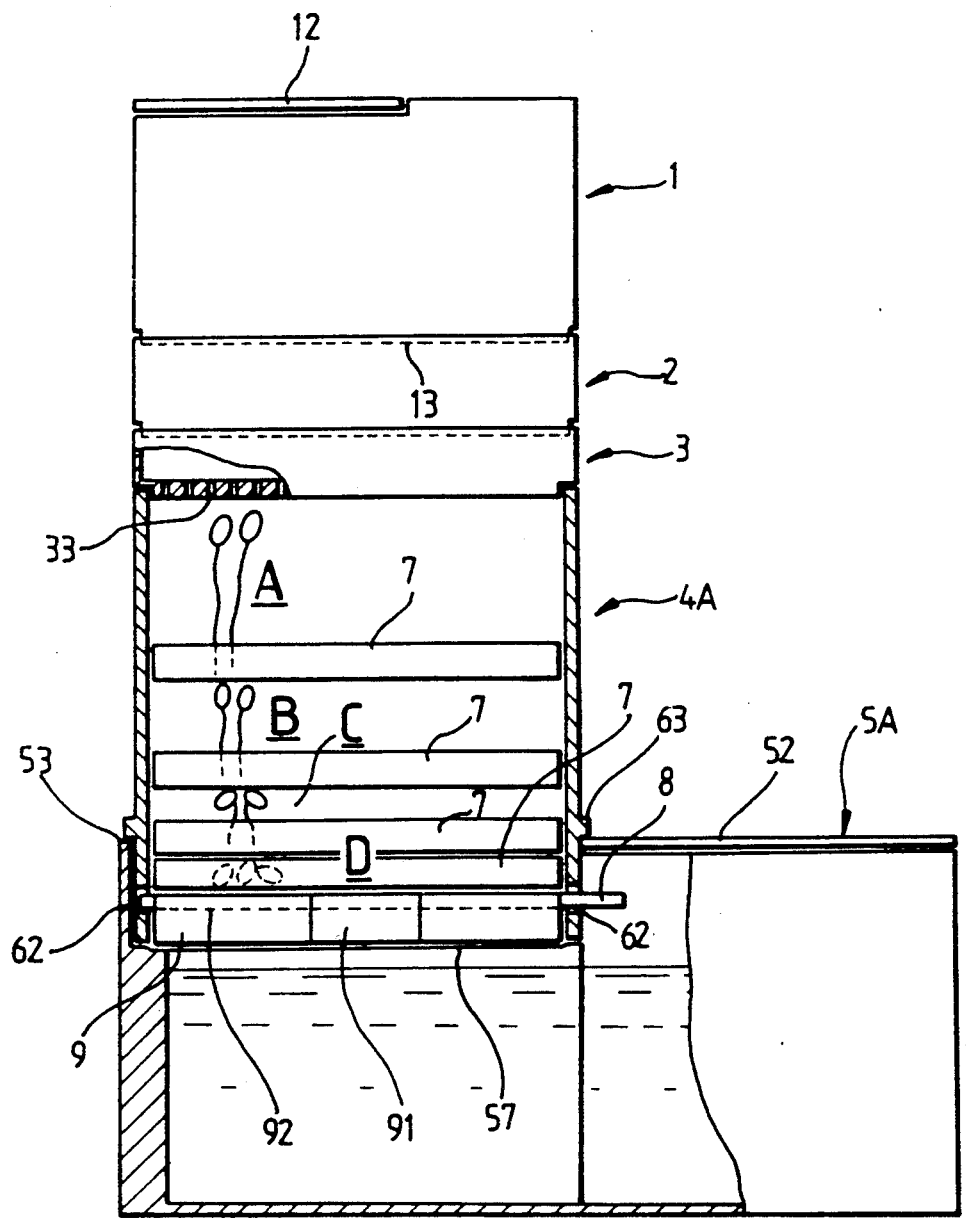
FIG. 10 is a partially cutaway front view of another embodiment of the apparatus for growing the bean sprouts according to the present invention.

FIG. 10 shows another apparatus for growing the bean sprouts according to another embodiment of the present invention. This apparatus has the same constitution as in the apparatus of FIG. 1 except the constitutions of a different type of the planting container 4A and a little different bottom water reservoir 5A from those of the before mentioned embodiment of an apparatus for growing the bean sprouts.

Figure 11:
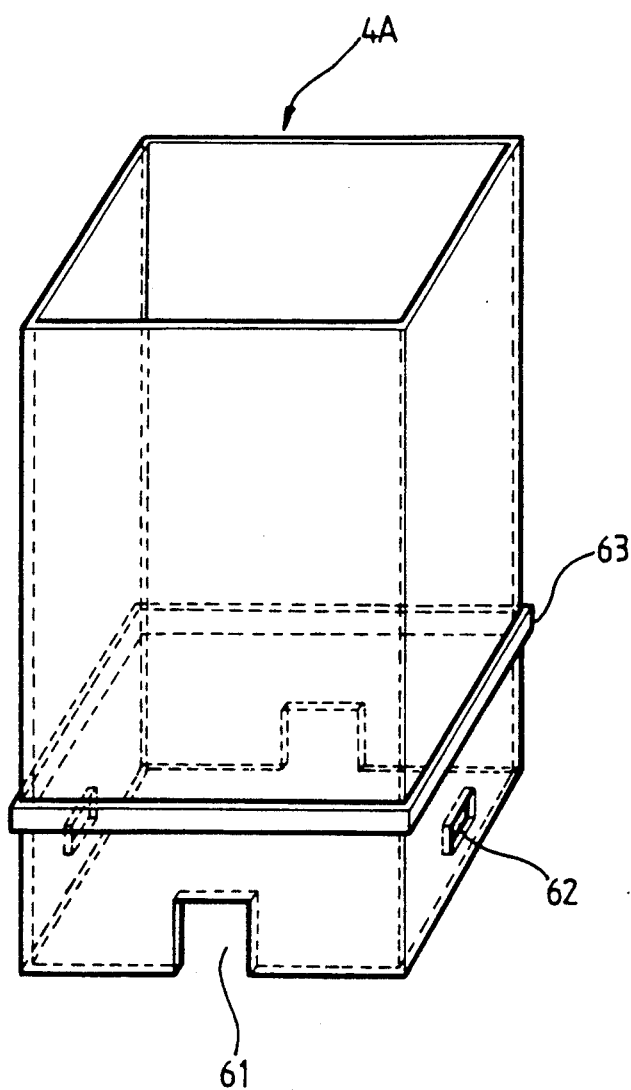
FIG. 11 is a perspective view of a planting container for the apparatus for growing the bean sprouts shown in FIG. 10.

FIG. 11 shows the said different planting container 4A for the apparatus of FIG. 10. The planting container 4A has a higher height than the height of the before mentioned planting container 4 in FIG. 1 and has not the bottom. The planting container 4A has a support strip 63, a pair of an undercuts 61 in which will be received a protruded portions 91 of a planting frame support 9 which is described in the following, and a pair of a slots 62 in which will be received a support rod 8 which is also described in the following to be inserted.

Figure 12:
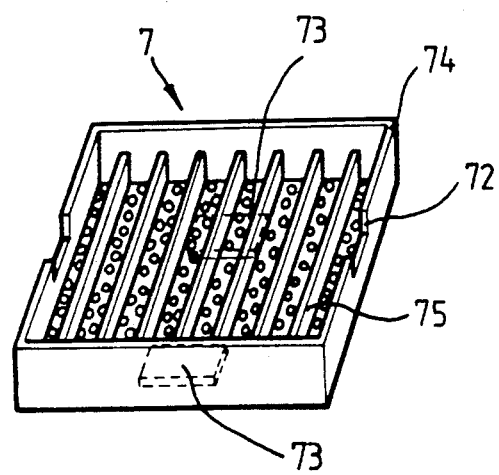
FIG. 12 is a perspective view of a planting frame for forming a bean sprouts bed on it, the frame being inserted into the bean sprouts container shown in FIG. 11.
Figure 13:
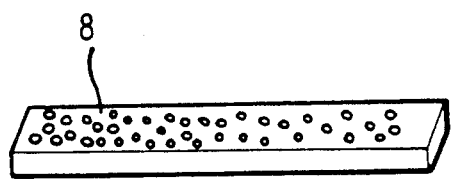
FIG. 13 is a perspective view of a supporting rod for supporting the lowest planting frame inserted into the planting container shown in FIG. 11.
Figure 14:
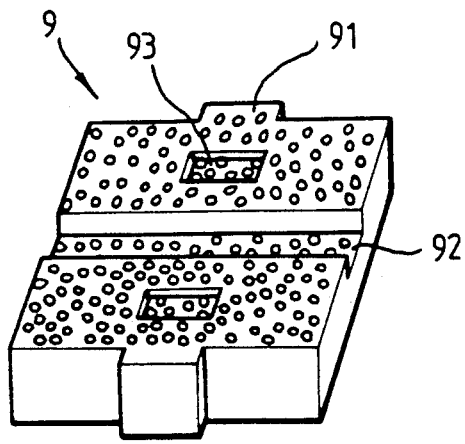
FIG. 14 is a perspective view of a planting frame support for upwardly supporting the planting frame in the planting container when the apparatus for growing the bean sprouts is assembled as shown in FIG. 10.

FIG. 12 to FIG. 14 show a planting frame 7, a support rod 8 and a planting frame support 9 respectively which will be inserted into the planting container 4A in FIG. 11. Each of the said elements is provided with many drain holes which are properly distributed.

The planting frame 7 has a pair of a cutouts 72 for providing the passway of a support rod 8, a pair of protrusions 73 under the bottom, and the reinforcement ribs 75 for reinforcing the planting frame. When the planting frames 7 are inserted into the planting container 4A in layers each planting frame provides a bean sprouts beds, respectively.

The planting frame support 9 has a pair of a protruded portions 91, a pair of holes 93, and a slot 92 for providing the passway of the support rod 8. The planting frame support 9 supports the planting frames 7 and the bean sprouts of the bean sprouts beds formed thereon when the apparatus is assembled. When the apparatus is assembling, the planting frame support 9 pushes the planting frames into the planting container upwardly so that the lowermost planting frame 7 is positioned properly and then the support rod 8 can be inserted under the lowermost planting frame through the slots 62 of the planting container 4A and the slots 92 of the planting frame support 9 in order to be able to support all the inserted planting frames 7 by the support rod 8.

Figure 15:
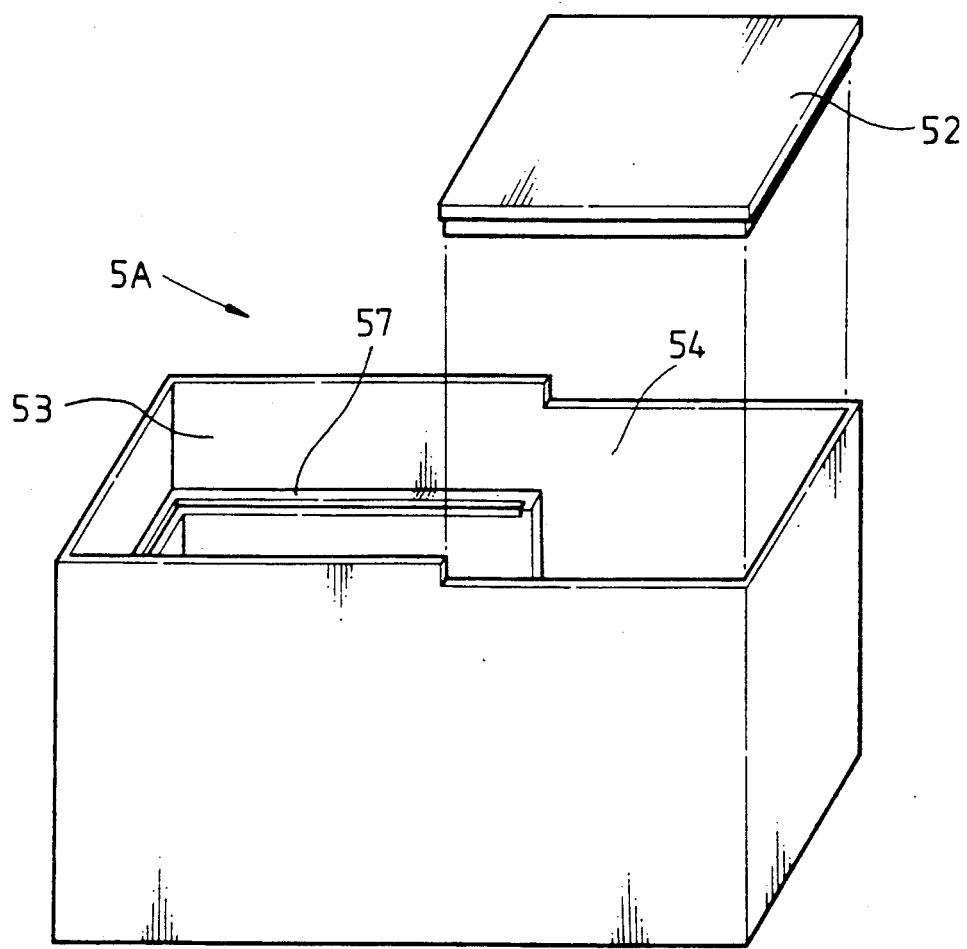
FIG. 15 is a perspective view of a bottom water reservoir for the apparatus shown in FIG. 10, FIG. 16A to FIG. 16C are the partially cutaway front views of the planting container, which show how to insert the planting frames, the supporting rod and the planting frame support into the planting container.

FIG. 15 shows a bottom reservoir 5A for the apparatus for growing the bean sprouts as shown in FIG. 10. The constitutions of the bottom reservoir 5A are almost the same as that of the bottom reservoir 5 in FIG. 1 except that a planting frame support seat 57 is provided on a opening 53.

Figure 16:
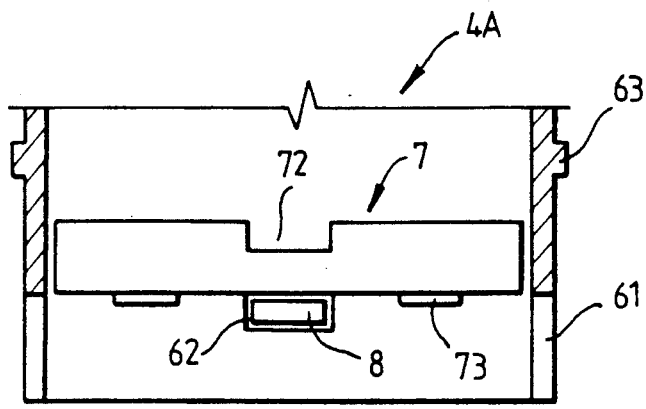
Figure 16:
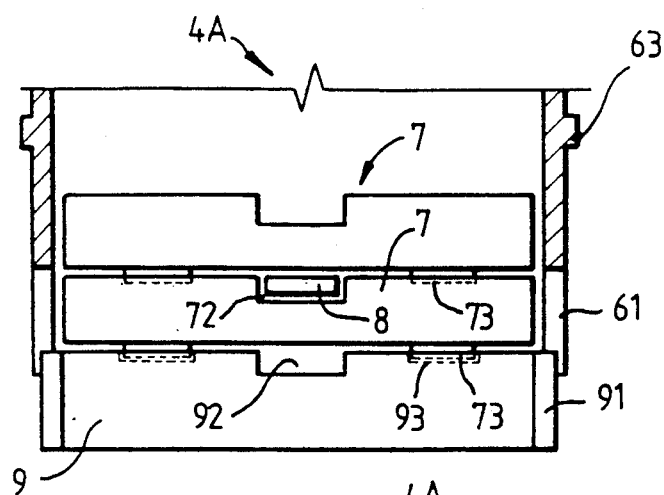
Figure 16:
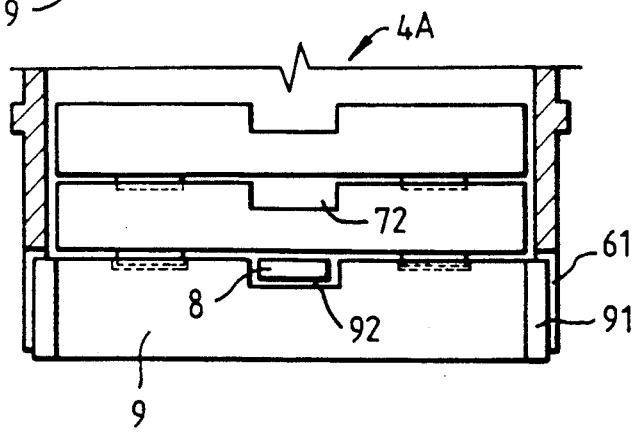

FIG. 16A to FIG. 16C show how to insert another planting frame and to assemble the supporting rod and the planting frame support into the planting container 4A.

In FIG. 16A, a planting frame 7 is inserted in the planting container 4A being supported by the support rod 8. Firstly, another planting frame 7 is positioned on the planting frame support 9 the protrusions 73 being inserted into the holes 93 and then the planting container 4A assembled as shown in FIG. 16A is laid on them the protruded portions 91 being fitted in the undercuts 61 of the planting container 4A.

Thereafter, the support rod 8 is pulled out from the slot 62 of the planting container 4A and the cutouts 72 of the planting frame 7 and then the planting container 4A is pressed down. Thereafter, the support rod 8 can be inserted into under the bottom of the newly inserted planting frame 7 through the slots 62 and the slot 92 of the planting frame support 9 as shown in FIG. 16C. By repeating the said process, several bean sprouts beds for growing the bean sprouts in the planting container 4A can be formed.

Figure 17:
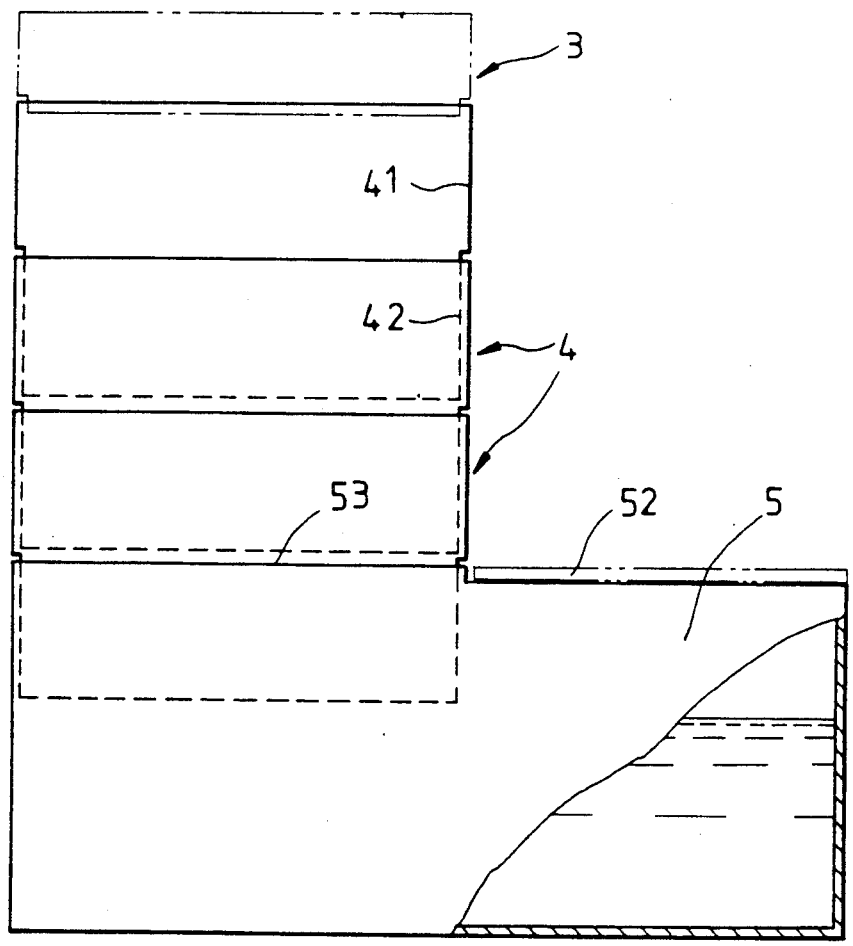
FIGS. 17 and 18 are a partially cutaway front views of the further embodiments of the apparatuses for growing the bean sprouts according to the present invention, respectively.
Figure 18:
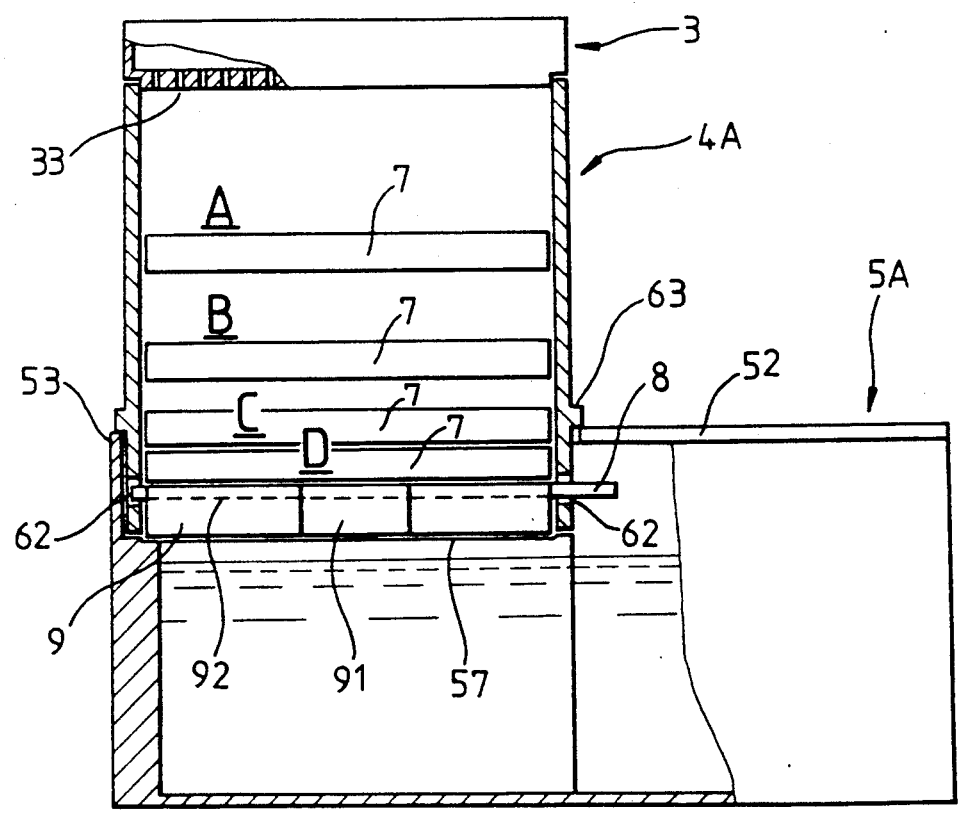

FIG. 17 and FIG. 18 shown an apparatuses for growing the bean sprouts according to the further embodiments of the present invention, respectively.

In these embodiments, there are no top water reservoir and measuring container.

Therefore, the grower should spray the water on the water spray container by hand at intervals.

While the invention has been particularly shown and described with reference to preferred embodiments thereof, it will be understood by those skilled in the art that various changes and modifications can be made therein without departing from the spirit and scope of the invention.

Further, although the method and apparatus were described in connection with growing bean sprouts, the method and apparatus of the present invention could be used for growing green bean sprouts, radish's sprouts or other seed's sprouts.

I claim:

1. An apparatus for growing bean sprouts comprising:
   planting container means forming a plurality of bean sprouts beds in layers upward and downward;
   a bottom water reservoir positioned under said planting container means;
   a top water reservoir positioned at a top portion of the apparatus and having a timer hole in a bottom member for controlling the flow rate of water flowing therethrough;
   a water spray container carried on said planting container means and having a large number of water spray holes in a bottom member; and
   measuring container means for supplying water received through the timer hole to the water spray container at time intervals determined by the time hole.

2. The apparatus as claimed in claim 1, wherein the planting container means comprises:
   a plurality of planting containers, a lower portion of each planting container being smaller than an upper portion of another container so as to be mountable therein.

3. The apparatus as claimed in claim 1, wherein the planting container means includes:
   a single planting container having an open bottom and a plurality of planting frames supported in the planting container for forming a planting bed;
   a planting frame support for supporting the planting frames; and
   a support rod between a lowest planting frame and the planting frame support for supporting the bean sprouts and the planting frames in the planting container.

4. The apparatus as claimed in claim 1, wherein the timer hole of the top water reservoir comprises a fixed hole having a downward flared extension.

5. The apparatus as claimed in claim 4, wherein said timer hole further comprises a control hole formed in a control valve and a control valve seat provided around the fixed hole, the fixed hole and the control hole being eccentrically formed relative to the common center of the control valve and the control valve seat whereby the overlapping portion of the fixed hole and control hole can vary.

6. The apparatus as claimed in claim 4, wherein the timer hole further comprises a needle valve provided with a needle positioned above the fixed hole and a hanger rod and a hanger rod seat formed around the fixed hole with a plurality of pairs of opposite grooves for seating the hanger rod, each pair of grooves being in different levels so that the annular space formed between the fixed hole and the needle can vary.

7. The apparatus as claimed in claim 1, wherein said measuring container means comprises a water container and float valve provided in the container so that when the measuring container is filled with a predetermined amount of water, the valve is opened to have the water flushed from the water container into the water spray container.

8. The apparatus as claimed in claim 1 wherein said measuring container means comprises a tumbler type measuring container pivotably mounted in the water spray container by a shaft which is above the bottom of the measuring container and offset from a vertical plane which divides the measuring container into equal volumes, the measuring container having a weight attached to the bottom, and a stop provided inside the water spray container for supporting the measuring container in an upright state whereby when the measuring container is filled with a predetermined amount of the water the measuring container suddenly rotates about the shaft and then the water in the measuring container is poured over into the water spray container.

9. The apparatus as claimed in claim 2, wherein the timer hole of the top water reservoir comprises a fixed hole having a downward flared extension.

10. The apparatus as claimed in claim 9, wherein said timer hole further comprises a control hole formed in a control valve: and a control valve seat provided around the fixed hole, the fixed hole and the control hole being eccentrically formed relative to the common center of the control valve and the control valve seat whereby the overlapping portion of the fixed hole and control hole can vary.

11. The apparatus as claimed in claim 9, wherein the timer hole further comprises a needle valve provided with a needle positioned above the fixed hole and a hanger rod, and a hanger rod seat formed around the fixed hole with a plurality of pairs of opposite grooves for seating the hanger rod, each pair of grooves being in different levels so that the annular space formed between the fixed hole and the needle can vary.

12. The apparatus as claimed in claim 9, wherein said measuring container means comprises a water container and float valve provided in the measuring container so that when the measuring container is filled with a predetermined amount of water the valve is opened to have the water flushed from the water container into the water spray container.

13. The apparatus as claimed in claim 9, wherein said measuring container means comprises a tumbler type measuring container pivotable mounted in the water spray container by a shaft which is above the bottom of the measuring container and offset from a vertical plane which divides the measuring container into equal volumes, the measuring container having a weight attached to the bottom, and a stop provided inside the water spray container for supporting the measuring container in an upright state, whereby when the measuring container is filled with a predetermined amount of the water the measuring container suddenly rotates about the shaft and then the water in the measuring container is poured over into the water spray container.

14. The apparatus as claimed in claim 3, wherein the timer hole of the top water reservoir comprises a fixed hole having a downward flared extension.

15. The apparatus as claimed in claim 14, wherein said timer hole further comprises a control hole formed in a control valve: and a control valve seat provided around the said fixed hole, the fixed hole and the control hole being properly eccentrically formed relative to the common center of the control valve and the control valve seat whereby the overlapping portion of the fixed hole and control hole can vary.

16. The apparatus as claimed in claim 14, wherein the timer hole further comprises a needle valve provided with a needle positioned above the fixed hole and a hanger rod, and a hanger rod seat formed around the fixed hole with a plurality of pairs of opposite grooves for seating the hanger rod, each pair of grooves being in different levels so that the annular space formed between the fixed hole and the needle can vary.

17. The apparatus as claimed in claim 3, wherein said measuring container means comprises a water container and float valve provided in the measuring container so that when the measuring container is filled with a predetermined amount of water, the valve is opened to have the water flushed from the water container into the water spray container.

18. The apparatus as claimed in claim 3, wherein said measuring container means comprises a tumbler type measuring container pivotably mounted in the water spray container by a shaft which is above the bottom of the measuring container and offset from a vertical plane which divides the measuring container into equal volumes, the measuring container having a weight attached to the bottom, and a stop provided inside the water spray container for supporting the measuring container in an upright state, whereby when the measuring container is filled with a predetermined amount of the water the measuring container suddenly rotates about the shaft and then the water in the measuring container is poured over into the water spray container.

* * * * *